United States Patent [19]
Tanaka

[11] Patent Number: 5,439,421
[45] Date of Patent: Aug. 8, 1995

[54] STRUCTURE COMPRISING SHAFT AND OUTER MEMBER HAVING IMPROVED PLAY-PREVENTING SLEEVE

[75] Inventor: Kouji Tanaka, Osaka, Japan
[73] Assignee: Tsubakimoto Chain Co., Osaka, Japan
[21] Appl. No.: 311,549
[22] Filed: Sep. 23, 1994
[30] Foreign Application Priority Data
  Sep. 30, 1993 [JP] Japan ............................ 5-057374 U
[51] Int. Cl.⁶ .......................................... F16G 13/00
[52] U.S. Cl. .................................................. 474/206
[58] Field of Search ........ 474/206, 207, 209, 212–217; 59/4, 84, 85

[56] References Cited
U.S. PATENT DOCUMENTS
3,153,348 10/1964 Kuntzmann .................... 474/213 X
4,704,098 11/1987 Tsubakimoto .................... 474/206
5,305,594 4/1994 Wang .............................. 474/206 X FOREIGN PATENT DOCUMENTS
278064 10/1993 Japan.

Primary Examiner—Michael Powell Buiz
Attorney, Agent, or Firm—Howson & Howson

[57] ABSTRACT

In a roller chain, a plastic bushing sleeve has flanges which are integrally formed on the ends of the sleeve by injection molding. These flanges fit into complementary recesses in the outer faces of the inner link plates of the chain and prevent axial translation of the sleeve. The flanges and recesses may be made non-circular to prevent rotation of the sleeve. Alternatively, complementary projections and depressions can be formed on circular flanges and on the floors of the recesses. A similar sleeve is incorporated into the rollers of the chain.

12 Claims, 2 Drawing Sheets

STRUCTURE COMPRISING SHAFT AND OUTER MEMBER HAVING IMPROVED PLAY-PREVENTING SLEEVE

BRIEF SUMMARY OF THE INVENTION

This invention relates to structures comprising inner and outer members which slide relative to each other, either longitudinally or rotationally. It relates more particularly to an improved sleeve for preventing play between the bore of an outer member and a shaft extending through the bore. The invention is particularly useful when applied to roller chains. The improved sleeve can be incorporated into a roller, or into a bushing through which an inner link plate extends.

In a conventional roller chain, the bushing through which a connecting pin extends has a sleeve, composed of a plastics material, press-fit into its bore. The sleeve reduces friction between the connecting pin and the bore of the bushing as they rotate relative to each other, and thereby reduces wear on the bushing and on the pin.

In an advance over the conventional approach, described in laid-open Japanese patent application 278064/1993, a sleeve of plastics material is formed in a bore of an outer member by injection molding.

The press-fit sleeves in accordance with the prior art are prevented from moving, axially and rotationally, relative to the bores in which they are placed by virtue of the frictional forces resulting from the press-fitting operation. Similarly, the injection molded sleeves in accordance with the prior art are prevented from moving, axially and rotationally, relative to the bores in which they are placed, by the adhesion of the sleeve and bore materials produced by the injection molding operation. Nevertheless, in both cases relative movement of the sleeve and bore is likely to occur in usage. The relative movement of the sleeve in the bore causes wearing of the sleeve and shortens its service life. There is also a likelihood that the sleeve will fall away from the bore.

The principal object of this invention is to provide an improved structure comprising a shaft and an outer member having a sleeved bore, in which the sleeve is more securely held against movement relative to the bore in which it is positioned. It is also an important object of this invention to provide a significant reduction in wear of the sleeve, thereby prolonging its service life. Still a further object of the invention is to prevent axial play of the sleeve in its bore, thereby avoiding accidental removal of the sleeve from the bore. Still a further object is to provide in improved sleeve which, when incorporated into a roller chain, reduces noise due to frictional engagement between inner and outer link plates. Still another object of the invention is to provide for more efficient assembly of a sleeve and an outer member having a bore, in a roller chain for example, by eliminating press-fitting and by eliminating the need for stop rings to hold the sleeve in place.

A preferred structure in accordance with the invention comprises an outer member having first and second ends and a bore with an inner wall extending transverse to the first and second ends. A shaft extends through the bore and is able to move relative to the bore while remaining substantially in coaxial relationship to the bore. To eliminate play between the shaft and the bore, a sleeve is bonded by molding to the inner wall of the bore. The sleeve has first and second opposite ends, and a flange at least at one of its ends. The outer member has a recess at one of its first and second ends. The flange is engaged in the recess, and the flange and recess are complementary to each other.

The engagement of the flange with the floor of its complementary recess prevents axial movement of the sleeve in at least one direction.

In one preferred embodiment of the invention, the flange is in the form of a plate having a non-circular, e.g. oval, periphery. In this case, relative rotation of the sleeve and the outer member is prevented by the engagement of the flange in its complementary recess.

In another preferred embodiment, the recess has an outwardly facing surface, and the flange is in the form a plate having a circular periphery and an inner surface facing inwardly toward the outwardly facing surface (i.e. the floor) of the recess. At least one of the outwardly facing and inner surfaces has a protrusion, and the other has a complementary depression receiving the protrusion. Relative rotation of the sleeve and the outer member is prevented by the engagement of the protrusion and the complementary depression.

The advantages of the invention can be realized in a roller chain by providing a flanged sleeve in the rollers of the chain, and also by providing a flanged sleeve in an outer member, where the outer member is an assembly consisting of an inner link plate and a bushing.

Further objects, details and advantages of the invention will be apparent from the following detailed description when read in conjunction with the drawings.

DETAILED DESCRIPTION

Figure 1A:
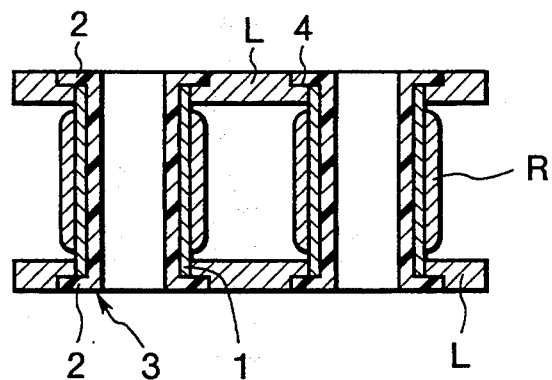
FIG. 1A is a cross-sectional view of a link assembly of a roller chain having a sleeved bushing in accordance with a first embodiment of the invention, taken on a longitudinally extending plane.
Figure 1B:
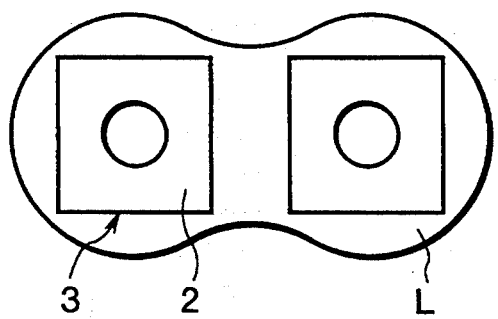
FIG. 1B is an elevational view of the link assembly of FIG. 1.

The link assembly of FIGS. 1A and 1B is an inner link of a transmission chain, i.e. a link comprising a pair of link plates L connected by bushings 1 and having rollers R surrounding the bushings and rotatable thereon. The bushings are press-fit into the inner link plates L. In the assembled chain, the bushings receive pins (not shown) connecting outer link plates (not shown).

Each bushing 1 has a plastic sleeve 3 formed by injection molding on its cylindrical internal surface. The injection molded sleeve may be formed in the manner described in laid-open Japanese Patent Application 278064/1993.

Each bushing 1 has non-circular flanges 2, preferably in the form of square plates, formed at its opposite ends. These flanges are securely held in complementary square recesses 4 formed in the outer faces of the link plates L. The engagement of the flanges in these complementary recesses secures the sleeves against both axial movement and rotation.

Figure 2A:
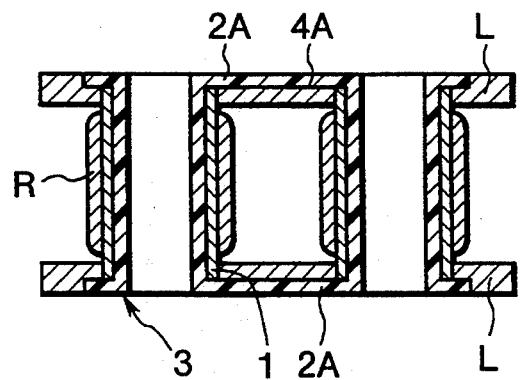
FIG. 2A is a cross-sectional view of a link assembly of a roller chain in accordance with a second embodiment of the invention.
Figure 2B:
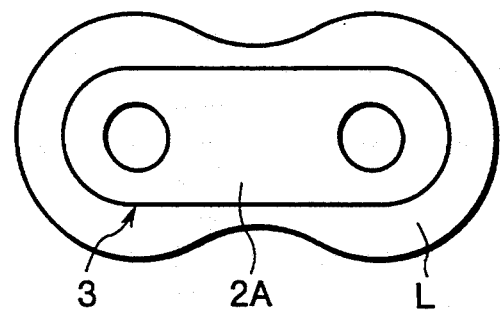
FIG. 2B is an elevational view of the link assembly of FIG. 2A.

In the embodiment depicted in FIGS. 2A and 2B, the sleeves 3 of two adjacent bushings 1 of an inner link assembly are connected together by an elongated, preferably oval-shaped, flanges 2A on both sides of the link assembly. The oval-shaped flanges are formed integrally with the sleeves by injection molding. Each oval flange 2A fits into a complementary oval recess in one of the link plates L. Here again, the engagement of the flanges with the recesses secures the sleeves against both axial and rotational movement.

Figure 3A:
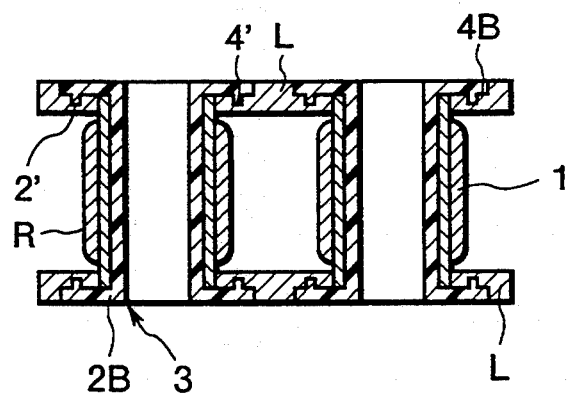
FIG. 3A is a cross-sectional view of a link assembly of a roller chain in accordance with a third embodiment of the invention.
Figure 3B:
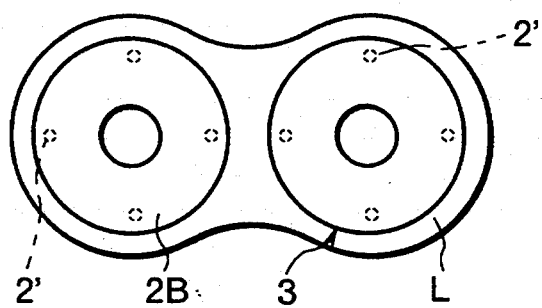
FIG. 3B is an elevational view of the link assembly of FIG. 3A.

In the embodiment depicted in FIGS. 3A and 3B, each of the sleeves 3 is provided with a circular flange 2B at both of its ends, and the circular flanges are received in complementary circular recesses 4B in link plates L. The circular flanges and their complementary recesses are, in themselves, incapable of preventing rotation of the sleeves. Therefore each of the flanges is provided, on its inwardly facing surface, with four protrusions 2', extending axially and disposed at 90° intervals. The protrusions 2' are received in complementary depressions 4' formed in the floors of the recesses of the link plates. The depressions are formed in the floors of the recess by punching or machining. The protrusions are formed on the flanges in the injection molding process. The engagement of the protrusions in the complementary depressions prevents the sleeves from rotating relative to the bushings.

Figure 4A:
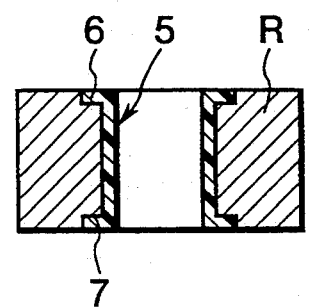
FIG. 4A is a cross-sectional view of a roller having a sleeve in accordance with the invention.
Figure 4B:
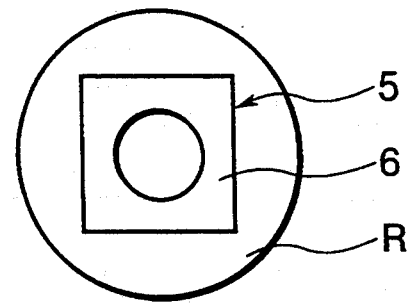
FIG. 4B is an elevational view of the roller of FIG. 4A.

FIGS. 4A and 4B illustrate a different application of the flanged sleeves. A flanged sleeve 5 is incorporated into a roller R of a roller chain by injection molding of the plastics sleeve into the internal cylindrical surface of the bore of the roller. Square flanges 6 are integrally formed at both ends of the sleeve in the injection molding process, and these flanges fit into complementary square recesses 7 formed in the ends of the roller.

In each of the above-described embodiments, the sleeve is securely held in its bore against both axial translation and rotation. Consequently, the possibility of excess wear due to such movements is substantially eliminated. The flanges also prevent the sleeve from accidently falling out of its bore. In the case of a roller chain, this is important prior to assembly.

An important advantage of the invention is that it eliminates the play of a sleeve, minimizes the number of parts needed to accomplish this objective, and provides for a remarkable improvement in manufacturing efficiency.

An advantage, realized where the invention is utilized in chain bushings, is that the flanges tend to reduce noise resulting from the frictional engagement of inner and outer link plates.

Various modifications can be made to the devices described. For example, in the embodiment of FIGS. 3A and 3B, the protrusions and depressions can be provided in any number, and can be interchanged so that the protrusions are provided one the floors of the link plates, while the depressions are provided in the inwardly facing surfaces of the flanges of the sleeves.

In the embodiment of FIGS. 4A and 4B, of course, the flanges can be oval-shaped or formed in any of various non-circular configurations to prevent relative rotation of the sleeve and the roller. Alternatively, relative rotation of the sleeve and roller can be prevented by utilizing projections and complementary depressions such as those depicted in FIGS. 3A and 3B.

While the invention has been described in the context of bushings and rollers in a roller transmission chain, it should be apparent that various advantages of the invention can be realized in other structures in which a shaft extends into a sleeved bore and is axially slidable, rotatable, or both slidable and rotatable therein. In some cases it will be unnecessary to provide flanges on both ends of the sleeve.

Various other modifications and applications can be made without departing from the scope of the invention as defined in the following claims.

I claim:

1. A structure comprising:
   an outer member having first and second ends and a bore with an inner wall extending transverse to said first and second ends;
   a shaft extending through said bore, wherein the shaft is able to move relative to the bore while remaining substantially in coaxial relationship to the bore; and
   means, for eliminating play between the shaft and the bore, comprising a sleeve bonded by molding to said inner wall of the bore, said sleeve having first and second opposite ends and having a flange at each end of said sleeve, said outer member having a recess at each of said first and second ends of the outer member;
   said flange being engaged in said recess and said flange and recess being complementary to each other.

2. A structure according to claim 1 in which the flange is in the form of a plate having a non-circular periphery, whereby relative rotation of the sleeve and the outer member is prevented by the engagement of the flange in the complementary recess.

3. A structure according to claim 1 in which the flange is in the form of a plate having an oval-shaped periphery.

4. A structure according to claim 1 in which the recess has an outwardly facing surface, in which the flange is in the form a plate having a circular periphery and an inner surface facing inwardly toward said outwardly facing surface of the recess, and in which at least one of said outwardly facing and inner surfaces has a protrusion, and the other of said outwardly facing and inner surfaces has a complementary depression receiving said protrusion, whereby relative rotation of the sleeve and the outer member is prevented by the engagement of said protrusion and said complementary depression.

5. A structure according to claim 1 in which said outer member is a roller of a roller chain.

6. A structure according to claim 2 in which said outer member is a roller of a roller chain.

7. A structure according to claim 3 in which said outer member is a roller of a roller chain.

8. A structure according to claim 4 in which said outer member is a roller of a roller chain.

9. A structure according to claim 1 in which said outer member is an assembly consisting of an inner link plate and a bushing of a roller chain.

10. A structure according to claim 2 in which said outer member is an assembly consisting of an inner link plate and a bushing of a roller chain.

11. A structure according to claim 3 in which said outer member is an assembly consisting of an inner link plate and a bushing of a roller chain.

12. A structure according to claim 4 in which said outer member is an assembly consisting of an inner link plate and a bushing of a roller chain.

* * * * *